(12) United States Patent
Al-Deek et al.

(10) Patent No.: US 10,109,192 B2
(45) Date of Patent: *Oct. 23, 2018

(54) WRONG WAY INDICATION BEACON AND RELATED METHODS

(71) Applicants: UNIVERSITY OF CENTRAL FLORIDA RESEARCH FOUNDATION, INC., Orlando, FL (US); CENTRAL FLORIDA EXPRESSWAY AUTHORITY, Orlando, FL (US)

(72) Inventors: Haitham Al-Deek, Orlando, FL (US); Corey Quinn, Longwood, FL (US)

(73) Assignees: CENTRAL FLORIDA EXPRESSWAY AUTHORITY, Orlando, FL (US); UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/797,130

(22) Filed: Oct. 30, 2017

(65) Prior Publication Data

US 2018/0075743 A1 Mar. 15, 2018

Related U.S. Application Data

(63) Continuation-in-part of application No. 15/223,186, filed on Jul. 29, 2016, now Pat. No. 9,805,596.
(Continued)

(51) Int. Cl.
*G08G 1/09* (2006.01)
*G08G 1/0967* (2006.01)
(Continued)

(52) U.S. Cl.
CPC ......... *G08G 1/096783* (2013.01); *E01F 9/00* (2013.01); *G06K 9/00785* (2013.01);
(Continued)

(58) Field of Classification Search
None
See application file for complete search history.

(56) References Cited

U.S. PATENT DOCUMENTS 7,075,427 B1 7/2006 Pace et al.
8,188,887 B2 * 5/2012 Catten ............... G06F 17/30241
340/425.5
(Continued)

OTHER PUBLICATIONS

Bayerische Motoren Werke (BMW) Automotive Group. Advance Warning of Drivers Heading in the Wrong Direction the "Wrong-Way Driver" Information. Press Release, 2007. Web. Accessed on May 6, 2016. https://www.press.bmwgroup.com/pressclub/p/pcgl/pressdetail.html?utputchannelid=6&id=T0012266EN&left_menu_item=node_2374. pp. 2.
(Continued)

*Primary Examiner* — Adolf Dsouza
(74) *Attorney, Agent, or Firm* — Allen, Dyer, Doppelt + Gilchrist, PA

(57) ABSTRACT

A wrong way vehicle detection system may include a warning station, a communications device and a controller to operate a forward facing movement sensor at the warning station to detect a wrong way vehicle on the roadway, and responsive to the detection of the wrong way vehicle on the roadway by the forward facing movement sensor, activate at least one flashing beacon and operate a rear facing movement sensor at the warning station to detect movement of the wrong way vehicle beyond the warning station. The controller may also, responsive to detection of the wrong way vehicle moving beyond the warning station, send a wrong way vehicle detection alert via the communications device.
(Continued)

The system may further include a navigation server to receive the wrong way vehicle detection alert and send a wrong way driver warning to a mobile wireless communications device(s) within a geographic boundary of the warning station.

19 Claims, 9 Drawing Sheets

Related U.S. Application Data

(60) Provisional application No. 62/199,579, filed on Jul. 31, 2015.

(51) Int. Cl.

| | | |
|---|---|---|
| *G08G 1/095* | (2006.01) | |
| *G08G 1/056* | (2006.01) | |
| *E01F 9/00* | (2016.01) | |
| *G06K 9/00* | (2006.01) | |
| *G08G 1/01* | (2006.01) | |
| *G08G 1/04* | (2006.01) | |
| *G08G 1/16* | (2006.01) | |

(52) U.S. Cl.
CPC ......... *G08G 1/0116* (2013.01); *G08G 1/0133* (2013.01); *G08G 1/04* (2013.01); *G08G 1/056* (2013.01); *G08G 1/095* (2013.01); *G08G 1/164* (2013.01)

(56) References Cited

U.S. PATENT DOCUMENTS

| | | | | |
|---|---|---|---|---|
| 8,849,554 | B2* | 9/2014 | Aubrey | G08G 1/00 340/933 |
| 9,251,707 | B2* | 2/2016 | Kugel | G01C 21/3697 |
| 9,640,072 | B2* | 5/2017 | White | H04N 5/23203 |
| 9,922,514 | B2* | 3/2018 | Gagvani | G08B 13/19615 |

OTHER PUBLICATIONS

Corey Quinn "Wrong-Way Driving Detection and Prevention System: A Pilot Deployment" Transportation Research Board 94th Annual Meeting Jan. 11-15, 2015; pp. 20.

Finley et al. "Conceptual design of a connected vehicle wrong-way driving detection and management system" Texas A&M Transportation Institute: Report 0-6867-1; Apr. 2016; pp. 214.

Grothues, Harry, "2012 ITS Texas Annual Meeting: Session 5B V2V and V2I Implementations: Connected Vehicle Wrong-Way Driver Countermeasures" SWRI. Dallas, TX. Oct. 26, 2012. PowerPoint Presentation; pp. 11.

Haitham Al-Deek "Wrong-Way Driving (WWD): Statistical Trends, Innovative Research Approach, and New Countermeasures to Combat WWD Events on Limited Access Highways" Workshop at the 7thTraffic Safely Conference; Amman, Jordan May 11, 2015; pp. 124.

Hakkert et al. "An evaluation of crosswalk warning systems: effects on pedestrian and vehicle behaviour" Transportation Research Part F. 5 (2002) 275-292. Abstract Only.

Liu et al. "Vision-Based Stop Sign Detection and Recognition System for Intelligent Vehicles" Transportation Research Record: Advanced Traffic Management Systems and Vehicle-Highway Automation 1748 (2001): 161-166. Abstract Only.

Ni et al. "Development of a Conceptual Framework toward an Integrated Transportation System" New England University Transportation Center Final Report: Nov. 30, 2009; pp. 29.

Rogers et al. "Wrong-Way Driving Incidents on Central Florida Toll Road Network, Phase-1 Study: An Investigation into the Extent of This Problem?" presented at the 2nd Transportation and Development Institute, ASCE, Jun. 8-11, 2014 in Orlando, Florida http://ascelibrary.org/doi/abs/10.1061/9780784413586.032 Abstract Only.

Rogers, Jr. et al. "Wrong-Way Driving on Florida Toll Roads: An Investigation Into Multiple Incident Parameters and Targeted Countermeasures for Reductions" Int. J. Engineering Management and Economics. vol. 5, Nos. 3/4, 2015: pp. 144-168.

Saetern, Lai T. "Wrong-Way Driving Prevention/Methods.FL Caltrans Division of Research, Innovation and System Information" Caltrans, 2015. Web. Accessed on Apr. 11, 2016. http://www.dot.ca.gov/newtech/researchreports/preliminary_investigations/docs/wrong-way_driving_prevention_methods_preliminary_investigation.pdf. pp. 8.

Sandt et al. "Wrong-Way Driving Prevention: Incident Survey Results and Planned Countermeasure Implementation in Florida" Transportation Research Record: Journal of the Transportation Research Board. No. 2484: 2015; pp. 99-109.

SES America. "Blank Out Signs" SESA. Web, 2016, Accessed on May 9, 2016. http://sesamerica.com/product/blank-out-signs/. pp. 4.

TAPCO "Lane Light In-Road Warning Lights" TAPCO Safe Travels. TAPCO, Web. Accessed on Jul. 28, 2016. http://www.tapconet.com/solar-led-division/in-road-warning-lights; pp. 3.

Finley et al. Texas Transportation Institute. "Assessment of the Effectiveness of Wrong Way Driving Countermeasures and Mitigation Methods" tti.tamu.edu. Texas Dept. of Transportation, Dec. 2014. Web Accessed on Apr. 11, 2016 http://d2dtl5nnlpfr0r.cloudfront.net/tti tamu.edu/documents/0-6769-1.pdf. pp. 172.

Toyota. "2013 Lexus LS Advanced Active Safety Features 2013 Consumer Electronics Show" Toyota/Lexus. 2013. Web Accessed on Apr. 11, 2016. http://www.toyota.com/esq/pdf/the%202013%20ls%20advanced%20active%20safety%20(2).pdf. pp. 6.

U.S. Appl. No. 15/677,501, filed Aug. 15, 2017.

White et al. "Algorithm for Predicating Inattentive Signal Violators in an Infrastructure-Based Intelligent System." Transportation Research Record: Intelligent Transportation Systems and Vehicle-Highway Automation 1886 (2004): 85-91. Abstract Only.

Wu, Hao. et al. "Efficiency of Simulated Vehicle-to-Vehicle Message Propagation in Atlanta, Georgia, I-75 Corridor" Transportation Research Record: Intelligent Transportation Systems and Vehicle-Highway Automation 1910 (2005): 82-89. Abstract Only.

\* cited by examiner

WRONG WAY INDICATION BEACON AND RELATED METHODS

RELATED APPLICATIONS

This application is a continuation-in-part of application Ser. No. 15/223,186 filed Jul. 29, 2016, which claims the benefit of provisional application Ser. No. 62/199,579 filed Jul. 31, 2015, which are both hereby incorporated herein in their entireties by reference.

TECHNICAL FIELD

The present disclosure generally relates to the field of vehicle traffic indicators, and more particularly to systems and devices which may be used for detecting wrong way drivers and providing warnings based thereon.

BACKGROUND

Wrong way driving (WWD) is a hazardous result of driver error/behavior, especially if it occurs on high speed roadways such as limited access facilities (including turnpikes or expressways). WWD may result in head-on collisions on the mainlines of limited access facilities. These collisions often cause severe injuries and even fatalities. The contributing causes for WWD driver error can vary and include driver intoxication and confusion, for example. Typically, these crash occurrences are documented and recorded by law enforcement officers and are available to engineering staff to later evaluate for safety analysis.

There are also many WWD incidents that do not result in a crash. Some of these wrong way drivers are stopped by law enforcement and issued a pertinent citation, but in some cases, the drivers are not intercepted. Other roadway users may report WWD events to emergency response personnel, such as a 911 computer aided dispatch (CAD) call center. In other cases, there might be no report of the WWD event and the WWD drivers might correct their direction of travel on their own or exit the limited access facility in the wrong direction.

When WWD crashes occur on limited access facilities, these events usually make news headlines and strike fear into those who use these high-speed roadways. A right way driver on the mainline can take little action to avoid a WWD vehicle, since the approach rates of both vehicles combine for an excessive rate of speed (e.g., 65 mph 65 mph=130 mph).

According to the National Transportation Safety Board (NTSB), only about 3% of crashes that occur on high-speed divided highways are caused by WWD (NTSB, 2012). Although WWD crashes are rare, the consequences can be severe. Therefore, it is important to try to reduce the occurrence of these crashes as much as possible.

SUMMARY

A wrong way vehicle detection system may include a warning station positioned along a roadway and including a wrong way indication sign facing away from a direction of oncoming traffic on the roadway, at least one flashing beacon adjacent the wrong way indication sign, a forward facing movement sensor adjacent the wrong way indication sign and facing away from the direction of oncoming traffic on the roadway, and a rear facing movement sensor adjacent the wrong way indication sign. The system may also include a communications device and a controller configured to operate the forward facing movement sensor to detect a wrong way vehicle on the roadway, and responsive to the detection of the wrong way vehicle on the roadway by the forward facing movement sensor, activate the at least one flashing beacon and operate the rear facing movement sensor to detect movement of the wrong way vehicle beyond the warning station. The controller may also, responsive to detection of the wrong way vehicle moving beyond the warning station, send a wrong way vehicle detection alert via the communications device. The system may further include a navigation server configured to receive the wrong way vehicle detection alert and send a wrong way driver warning to at least one mobile wireless communications device within a geographic boundary of the warning station.

More particularly, the wrong way driver warning may include a wrong way indicator corresponding to a geographic location of the warning station. Furthermore, the wrong way driver warning may include a text message and/or an audible message, for example. In accordance with one example implementation, the at least one flashing beacon may comprise at least one pair of flashing beacons. Moreover, the at least one pair of flashing beacons may include an upper pair of flashing beacons above the wrong way indication sign, and a lower pair of flashing beacons positioned below the wrong way indication sign.

Additionally, the warning station may further include a forward facing camera adjacent the wrong way indication sign and coupled to the controller, and the controller may further cause the forward facing camera to take a picture responsive to the forward facing movement sensor detecting the wrong way vehicle on the roadway. Furthermore, the warning station may also include a rear facing camera adjacent the wrong way indication sign and coupled to the controller, and the controller may further cause the rear facing camera to take a picture responsive to the rear facing movement sensor detecting movement of the wrong way vehicle beyond the warning station.

In an example embodiment, the warning station may be positioned along an off ramp of a mainline roadway, and the system may further include a camera positioned adjacent the intersection of the mainline roadway and the off ramp and configured to take a picture responsive to detecting movement of the wrong way vehicle beyond the warning station to confirm entry of the wrong way vehicle onto the mainline roadway. By way of example, the at least one of the forward facing and rear facing movement sensors may comprise radar sensors, Light Detection and Ranging (LIDAR) sensors, etc.

A related wrong way vehicle detection method is also provided.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Figure 1:
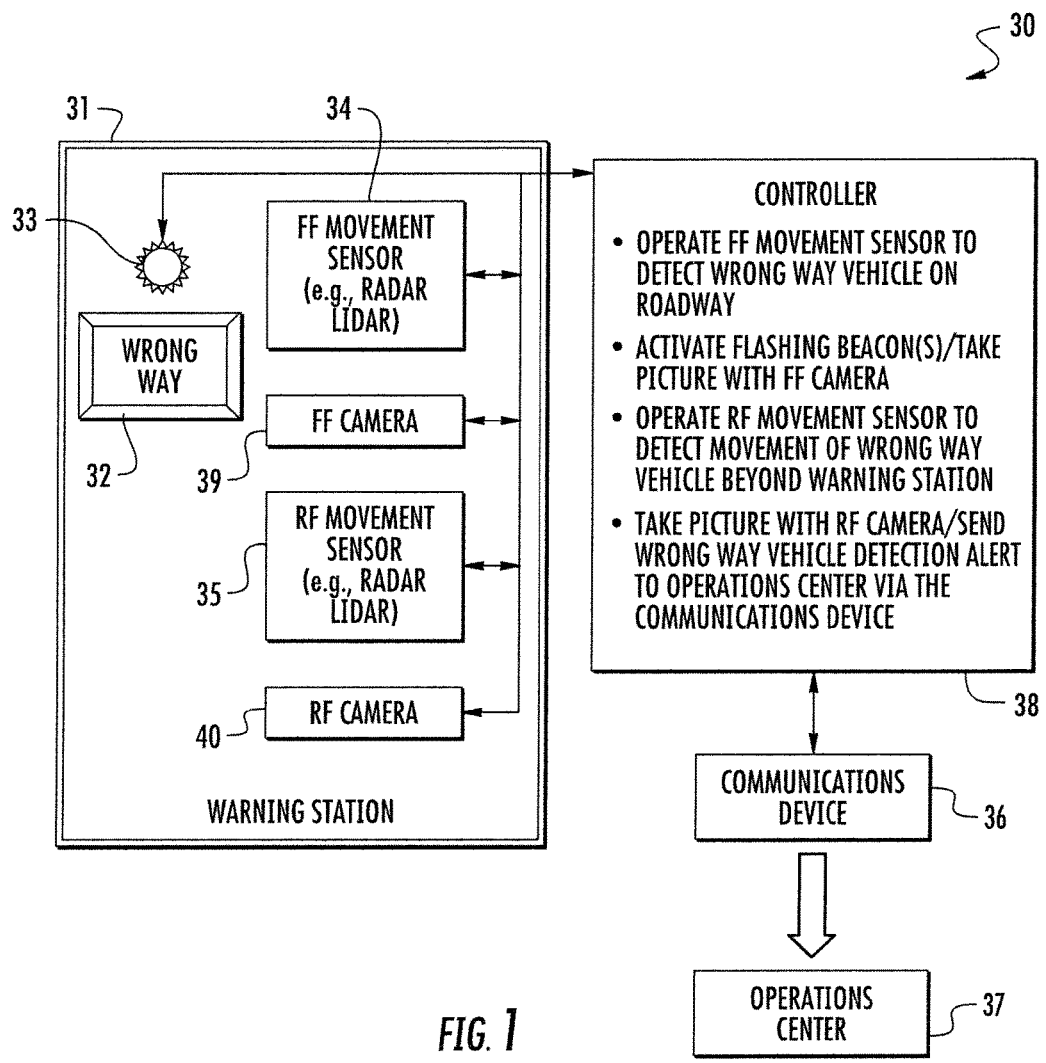
FIG. 1 is a schematic block diagram of a wrong way vehicle detection system in accordance with an example embodiment.

The present disclosure generally relates to detection and warning systems to provide a countermeasure for wrong way driving. Turning initially to FIG. 1 and the flow diagram 100 of FIG. 2, a wrong way vehicle detection system 30 and related operational aspects are first described. The system 30 illustratively includes a warning station 31 positioned along a roadway. The warning station 31 may take various forms, in that the various components thereof may be mounted on a signpost(s) or other structure(s) on the roadside, a building (such as a toll both), etc., or combinations thereof. Generally speaking, the warning station 31 may include a wrong way indication sign 32 facing away from a direction of oncoming traffic on the roadway. The sign 32 may have different warning messages in different applications, such as "wrong way", "do not enter", and/or "keep out", for example, and may be in different languages, fonts, colors, and/or shapes.

The warning station 31 further illustratively includes one or more flashing beacons 33 adjacent the wrong way indication sign 32. By way of example, the beacon 33 may include an incandescent or LED light, which may be in various shapes (e.g., circular, rectangular, etc.), colors (e.g., red, white, yellow, etc.), sizes, and configurations. Certain example beacon configurations are discussed further below.

The warning station 31 also illustratively includes a forward facing (FF) movement sensor 34 and a rear facing (RF) movement sensor 35 adjacent the wrong way indication sign 32. The forward facing movement sensor 34 faces away from the direction of oncoming traffic on the roadway, while the rear facing movement sensor 35 faces in a direction so that it may detect when a wrong way vehicle moves past or beyond the warning station 31. Stated alternatively, the forward facing movement sensor 34 is oriented to face a wrong way vehicle as it approaches the warning station 31, while the rear facing movement sensor 35 is oriented across the roadway or at least partially behind the warning station. Various types of movement sensors may be used, such as radar, laser (e.g., LIDAR), infrared, or other suitable sensors, for example. More particularly, example wireless sensors which may be used with the system 30 include the MicroRadar sensor from Sensys Networks, Inc., and the SmartSensor HD from Wavetronix L.L.C., although other suitable sensors may also be used. In some embodiments, combinations of different types of sensors may be used to help guard against false positives or leverage the abilities of different types of sensors to operate better in different weather conditions (e.g., sun, rain, snow, etc.).

The system 30 further illustratively includes a communications device 36, which may be used to communicate with an operations or traffic management center 37, for example. The operations center 37 may be managed by a private or government roadway department (e.g., an expressway authority, department of transportation, law enforcement, etc.) which may monitor information from the system 30 and dispatch responders accordingly. In accordance with one example embodiment, the communications device 36 may be a cellular communications device which communicates with the operations center 37 over a cellular network, e.g., via text messages. However, in other embodiments the communications device 36 may operate over other types of wireless networks, or if the infrastructure is available at the given location, it may communicate over a hardwired (e.g., fiber optic, etc.) connection to a communications network.

The system 30 also illustratively includes a controller 38 which cooperates with the warning station 31 and the communications device 36 to perform various operations. By way of example, the controller 38 may be implemented using appropriate hardware (e.g., microprocessor, etc.) and an associated non-transitory computer-readable medium having computer-executable instructions for causing the hardware to perform the various operations. Beginning at Block 101, the controller 38 may be configured to operate the forward facing movement sensor 34 to detect a wrong way vehicle on the roadway, at Block 102. For example, the forward facing movement sensor 34 may be operated or activated on a periodic basis or at specified intervals (e.g., one or more times per second) so that when a wrong way vehicle enters its sensing area the wrong way vehicle is detected. The interval at which the forward facing movement sensor 34 is activated may be determined based upon the expected speed at which a wrong way vehicle will approach the warning station 31. Power consumption may be another factor to consider when setting the frequency of operation of the forward facing movement sensor 34 when operating off of battery power. In this regard, the various components of the system 30 may be operated solely off of solar power in some embodiments, although power from a power grid may also be used where available (and in some configurations both types of power sources may be used).

Responsive to a detection of the wrong way vehicle on the roadway by the forward facing movement sensor 34 at Block 103, the controller 38 may accordingly activate the flashing beacon(s) 33 (Block 104) and operate the rear facing movement sensor 35 to detect if the wrong way vehicle moves beyond the warning station 31. When it is detected that the wrong way vehicle has moved beyond the warning station, at Block 105, the controller 38 may accordingly send a wrong way vehicle detection alert to the operations center 37 via the communications device 36, at Block 106, so that the police or other appropriate personnel may be dispatched to stop the wrong way driver. In accordance with one example embodiment, traffic device monitoring software such as BlinkLink® from Traffic & Parking Control Co., Inc. of Brown Deer, Wis. may be configured to provide such a notification to a traffic control center, although other suitable approaches may also be used. In some embodiments, other optional countermeasures may be deployed to stop the wrong way driver from proceeding at this point, e.g., the controller 38 could activate tire disabling devices, barriers, or gates that come down across the roadway as appropriate for the given implementation.

On the other hand, if there is no detection of the wrong way vehicle going beyond the warning station 31 after a timeout period, then it may be presumed that the vehicle turned around responsive to the flashing beacon 33 and is no longer continuing in the wrong direction along the roadway.

Figure 2:
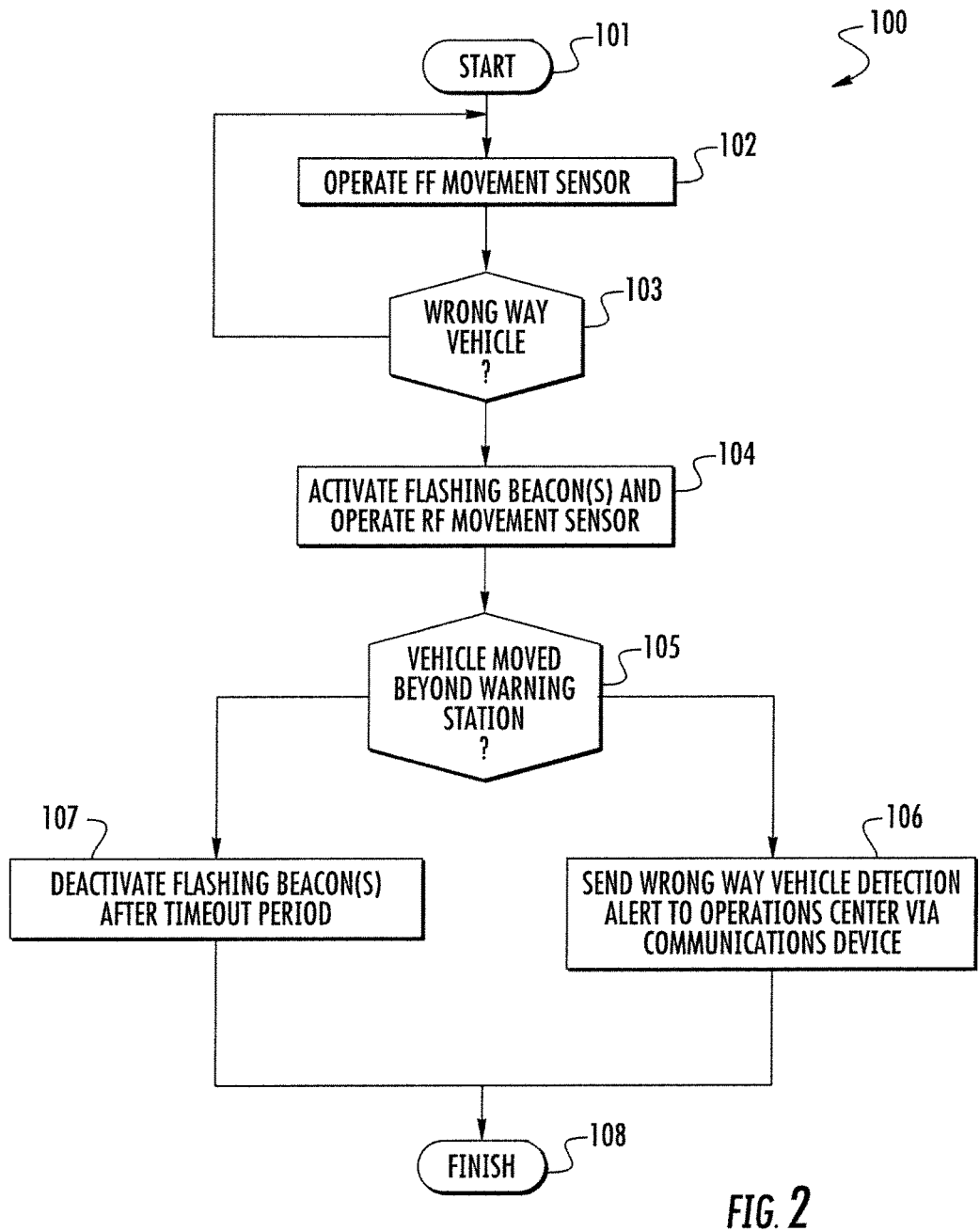
FIG. 2 is a flow diagram illustrating method aspects associated with the system of FIG. 1.

As such, the flashing beacon 33 may be deactivated and the system "reset" for the next occurrence of a wrong way driver, at Block 107. The method of FIG. 2 illustratively concludes at Block 108.

In the example illustrated in FIG. 1, the system 30 further illustratively includes an optional forward facing camera 39 and an optional rear facing camera 40 adjacent to the wrong way indication sign 32 and coupled to the controller 38. As such, the controller 38 may further cause the forward facing camera 39 to take a picture(s) responsive to the forward facing movement sensor 34 detecting the wrong way vehicle on the roadway. That is, when the wrong way vehicle is first detected by the forward facing movement sensor 34, a picture of the vehicle is also taken. Generally speaking, the field of view of the camera 39 may be aligned with or at least partially overlap the area covered by the sensor 34. Similarly, the controller 38 may also cause the rear facing camera 40 to take a picture(s) responsive to the rear facing movement sensor 40 detecting movement of the wrong way vehicle beyond the warning station 31. Here again, the field of view of the rear facing camera 40 may at least partially overlap with the area covered by the sensor 35 to help ensure that the vehicle is within the field of view of the camera when the picture is taken. One or both of the pictures taken by the forward facing and rear facing cameras 39, 40 may also be communicated to the operations center 37 via the controller 38 and communications device 36. Moreover, more than one picture may be taken (e.g., a plurality of rapid succession pictures), and in some embodiments the "picture" may be a video.

Figure 3:
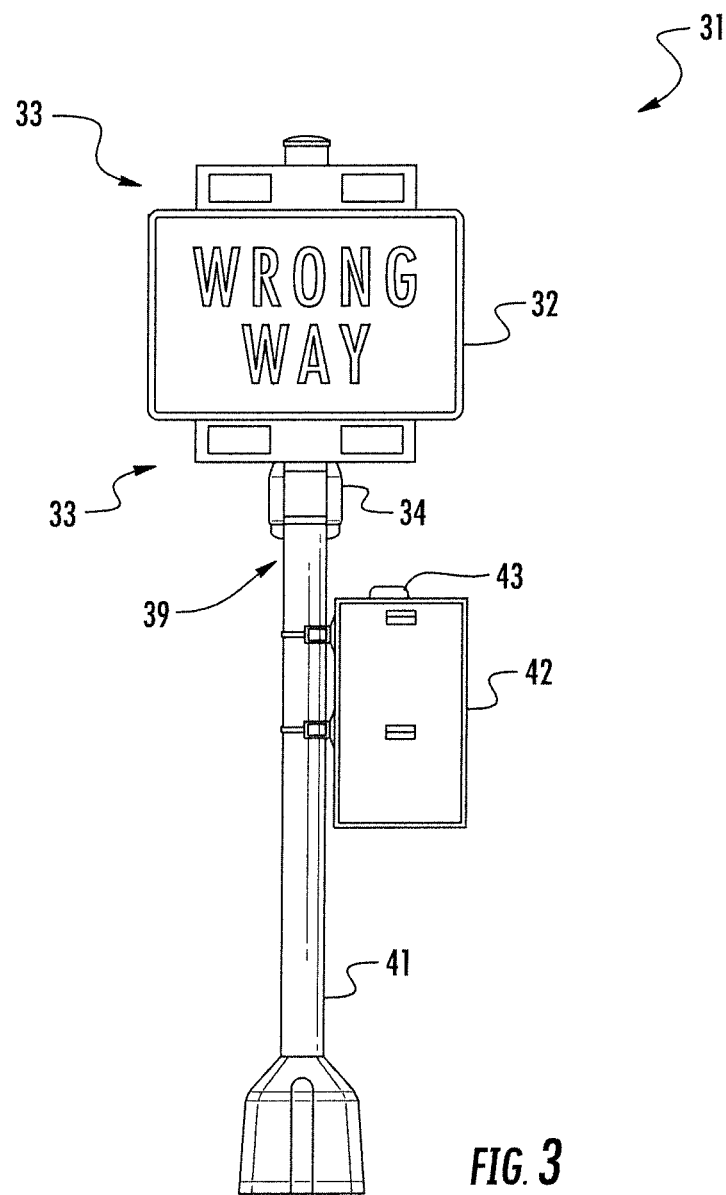
FIG. 3 is a front view of an example warning station which may be used with the system of FIG. 1.

Turning to FIG. 3, an example embodiment of a warning station 31 which is implemented on a sign pole 41 is now described. A housing or cabinet 42 is mounted on the post 41, which may be used to house the controller 38, cellular modem, and a primary or backup battery, for example. Moreover, a cellular modem antenna 43 is mounted on the exterior of the housing 42, although it may be mounted elsewhere (e.g., at the top of the sign pole 41) in other configurations.

Moreover, in the illustrated example the warning station 31 further illustratively includes upper and lower pairs of flashing beacons 33 positioned above and below the wrong way sign 32, although in some embodiments just the upper or lower pair of flashing beacons may be used (or more than two lights may be included in the beacon arrays). In this configuration, the flashing beacons 33 are referred to as rectangular rapid flashing beacons (RRFBs), which are designed to attract the attention of wrong way drivers better than existing LED configurations.

By way of example, the RRFB may be used at exit ramps of limited access highways (e.g., toll roads and turnpikes), high speed roads, or other places where there is potential for wrong way driving events to occur. In the illustrated configuration, the lights of the upper and lower flashing beacons 33 are operated out of phase with respect to one another. That is, the left light of the upper flashing beacon illuminates at the same time as the right light of the lower flashing beacon, and vice-versa. Moreover, the frequency of operation of the lights may be in a range of about 55 to 65 flashes per minute (FPM), and more particularly about 60 FPM, for example, although other frequencies may also be used. Moreover, a wig wag pattern with a 50% duty cycle flash pattern may also be used in some embodiments. A research study was conducted for the illustrated RRFB configuration in the above-described frequency range found that 75% of the respondents found the RRFB with alternating high frequency flashing lights to be better (i.e., more noticeable) than comparable pairs of LEDs flashing at the same time after watching videos of both. Other warning features may also be added at a warning station, such as a reflective (e.g., red) strip on the sign post 41, for example.

Figure 4:
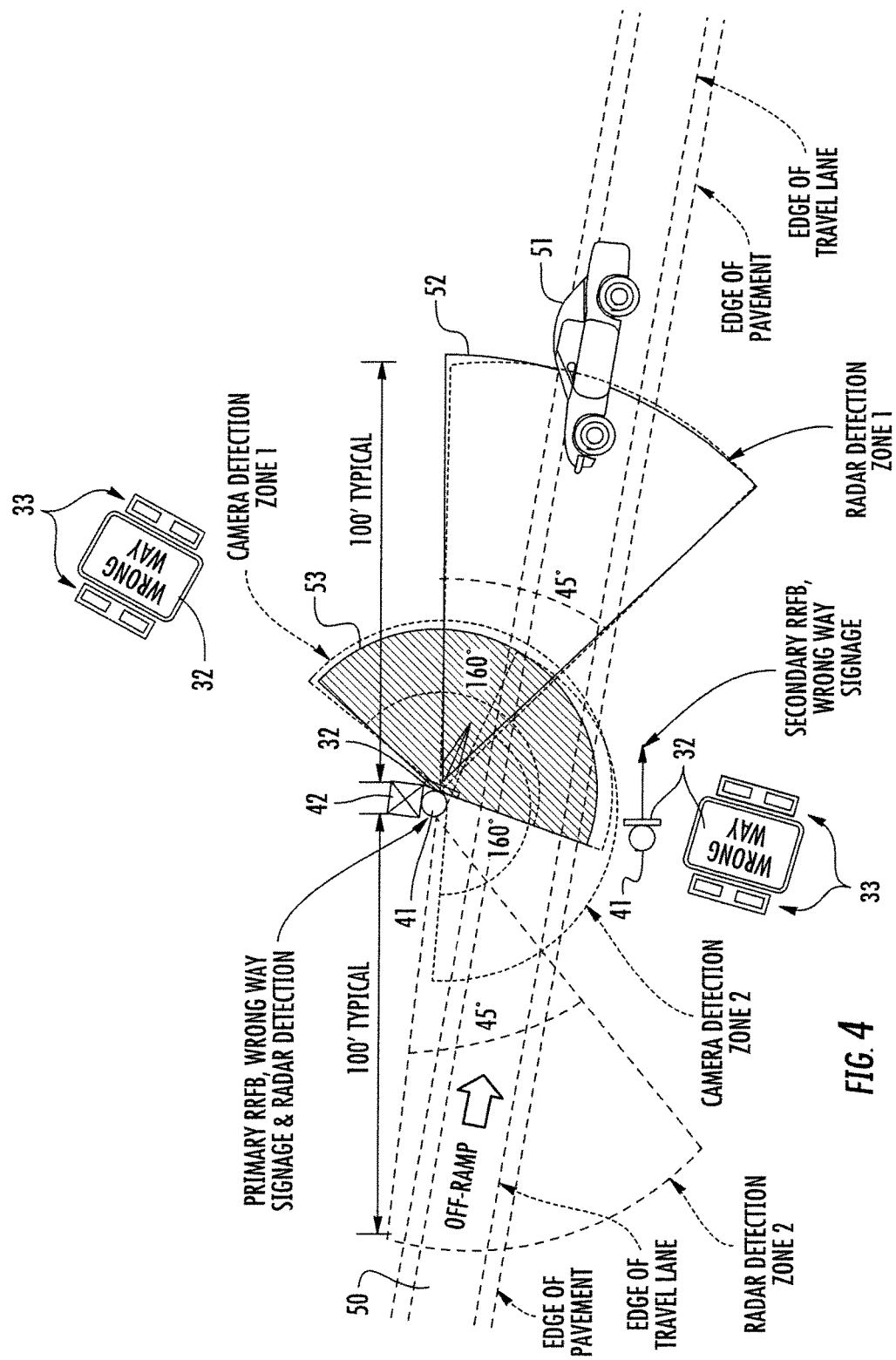
FIGS. 4-6 are a series of schematic diagrams illustrating an example implementation of the system of FIG. 1 at an off ramp of a roadway.
Figure 5:
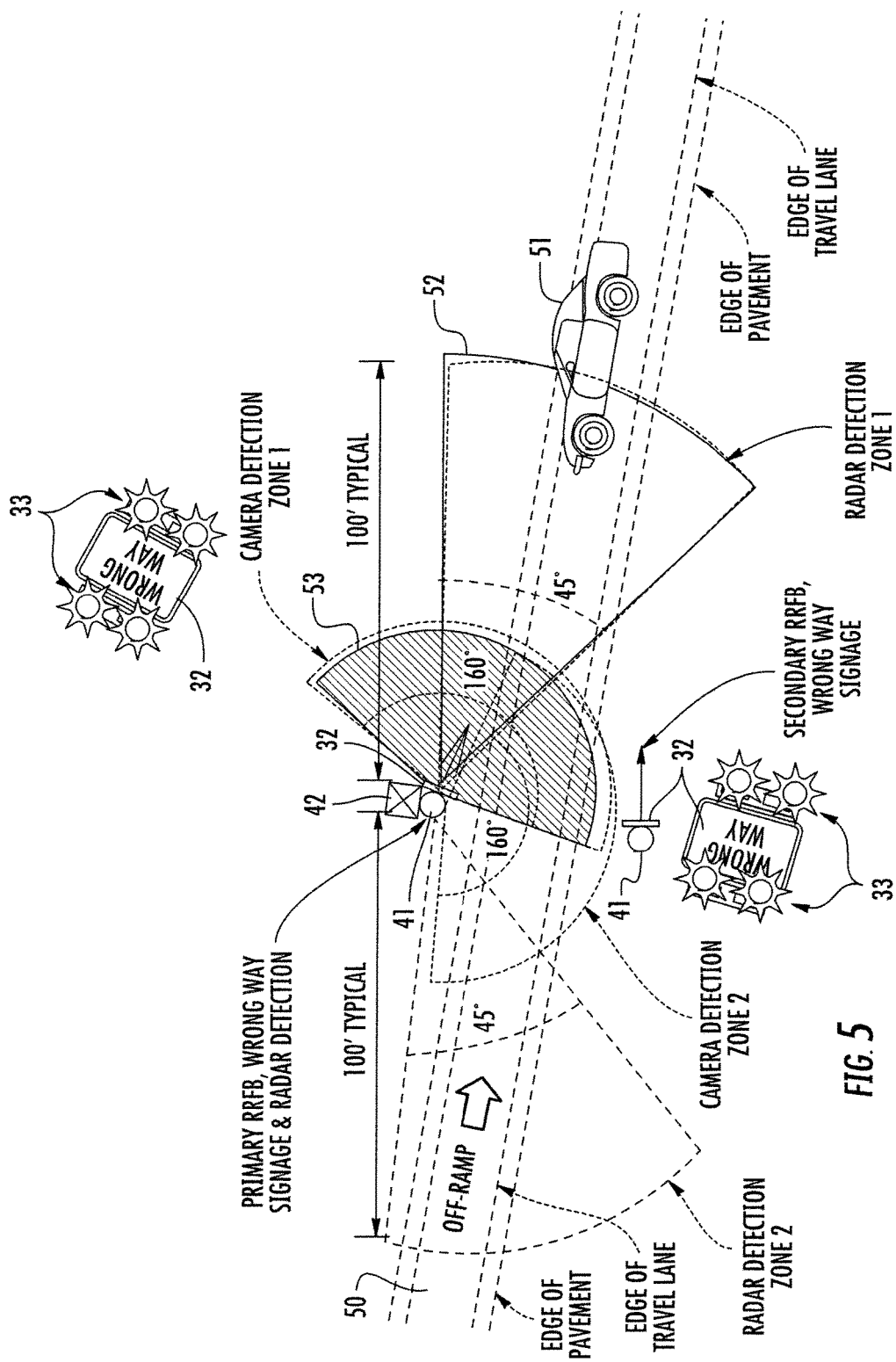
Figure 6:
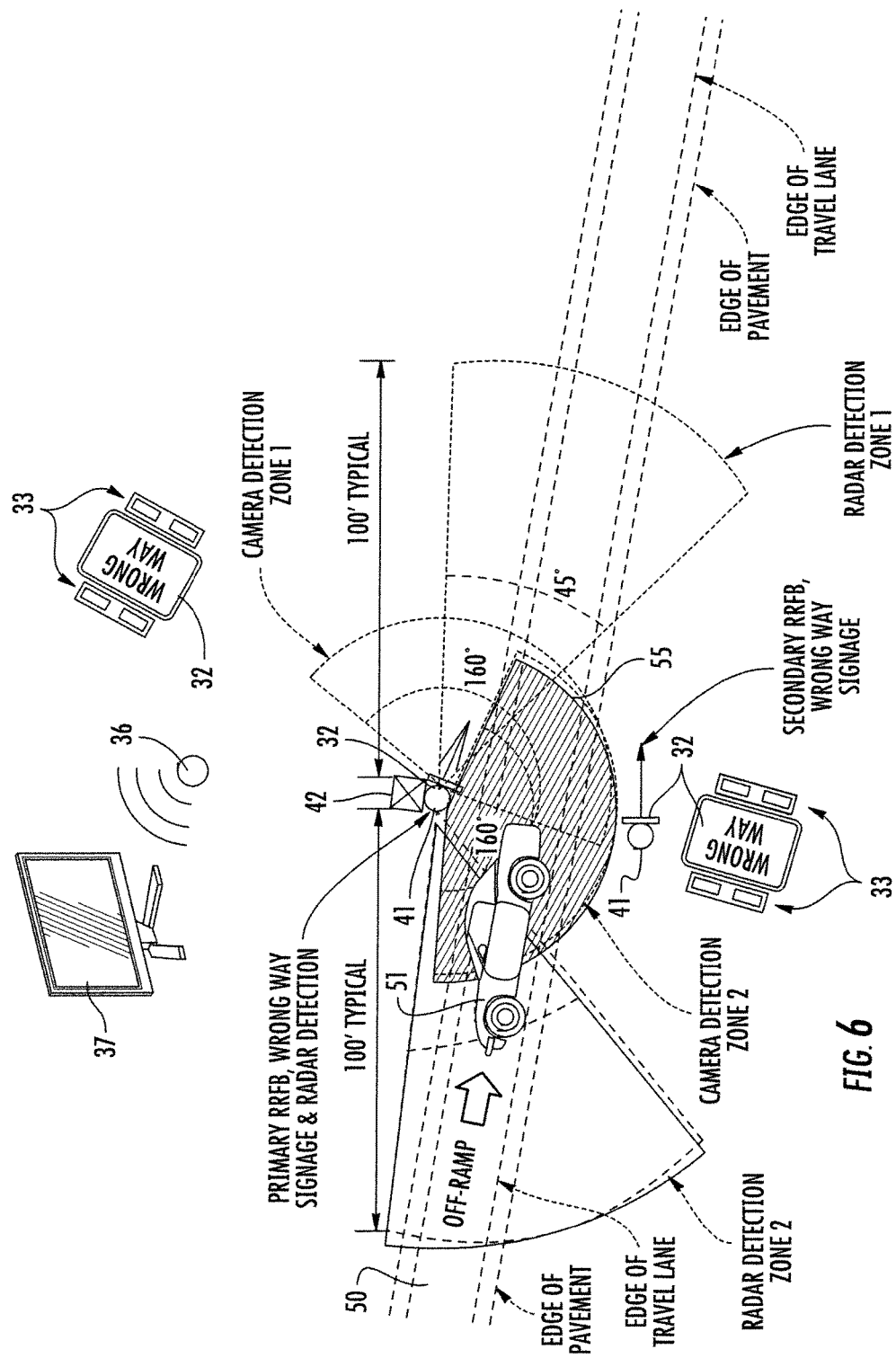

Referring now to FIGS. 4-6, an example use case is now described where a pair of the warning stations 31 each with respective upper and lower RRFBs are positioned on opposite sides of an off ramp or exit ramp 50 to a roadway (e.g., an expressway, turnpike, highway, etc.). In this configuration, both of the warning stations need not include all of the components described above. For example, one of the warning stations may simply include the sign post 41, wrong way sign 32, and the upper and lower flashing beacons 33, which may be activated by the controller 38 and forward facing movement sensor 34 of the other warning station. The camera and communications functions may also be handled by the other warning station as well. In some embodiments, some of the components may be mounted on one of the sign posts 41 and other components may be mounted on a different sign post 41. For example, the forward facing movement sensor and forward facing camera 39 may be mounted on one of the sign posts 41, and the rear facing movement sensor 35 and rear facing camera 40 may be mounted on the other sign pole. In other words, reference to a "warning station" herein may be to a single pole or object to which all of the above-noted components are mounted, or to multiple poles or objects with the above-noted components distributed between them. Of course, in some implementations, the same components may be installed on multiple sign poles 41 or other objects (e.g., multiple movement sensors to provide a wider sensing area, multiple cameras to provide different camera angles, etc.).

In the present example, a wrong way vehicle 51 enters the off-ramp 50 from the wrong direction (i.e., from the end of the off-ramp). When the wrong way vehicle 51 enters the first detection zone 52 of the front-facing movement sensor 34 (here a radar sensor), the vehicle is detected and a confirmation photo(s) of the vehicle is optionally taken within the first camera detection zone 53 to verify that the sensor detection was not a false positive, and/or to help identify the vehicle. As shown in FIG. 5, detection of the wrong way vehicle 51 in the zone 52 causes the controller 38 to activate the RRFBs, which in some cases will be sufficient to cause the driver to realize he or she is going the wrong way and turn around. However, in those cases where the driver continues to go the wrong way up the off ramp 50, the vehicle 51 will subsequently enter the second radar detection zone 54 of the rear facing sensor 35, triggering an alert to be sent to the operations center 37 and further causing the rear facing camera 40 to take another picture(s) of the vehicle 51 within the second camera detection zone 54.

Figure 7:
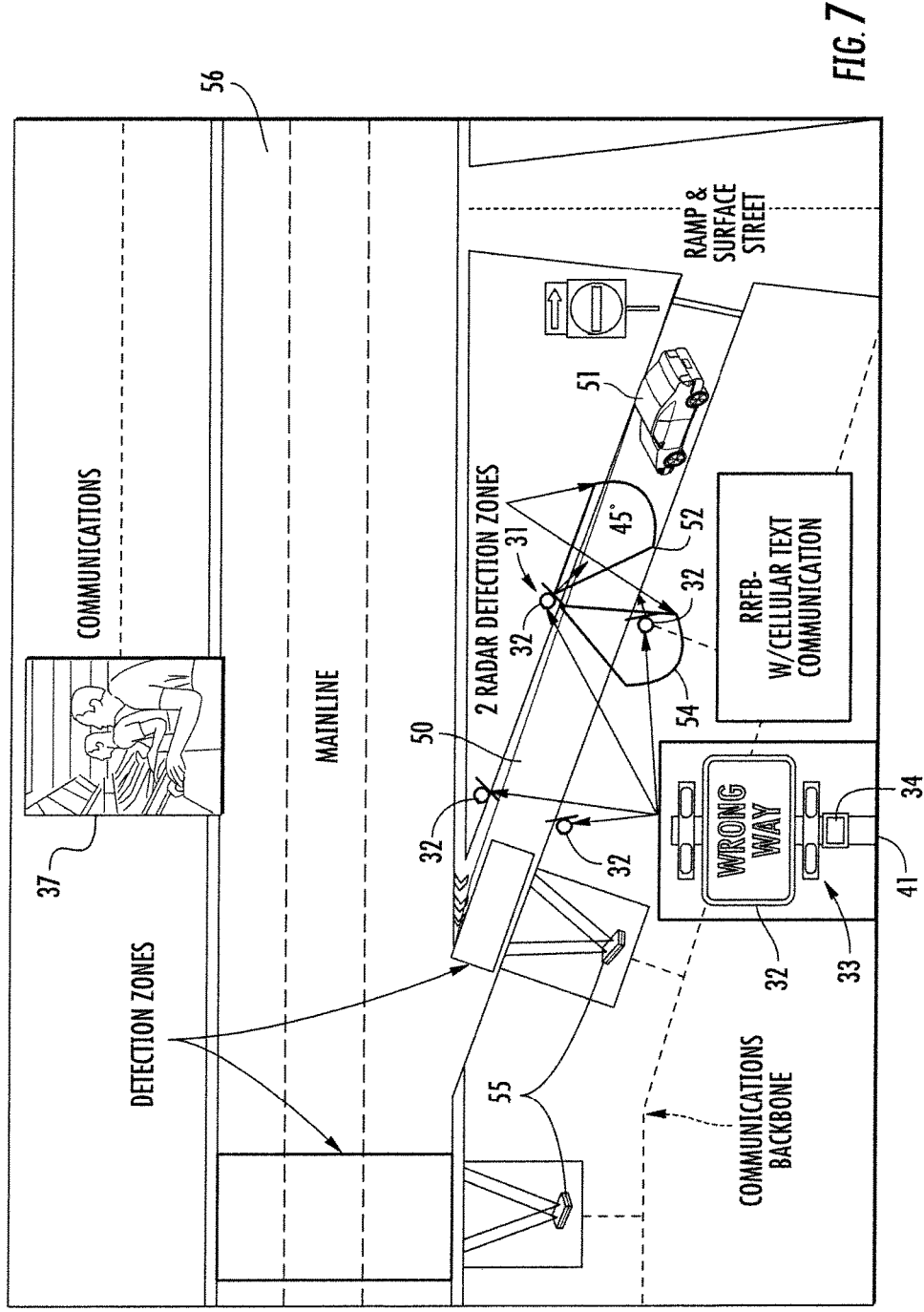
FIG. 7 is a schematic block diagram illustrating another example implementation of the system of FIG. 1 on an off ramp of a limited access roadway.

Still another example configuration is shown in FIG. 7, in which there are multiple sets of wrong way signs 32 positioned along the off ramp 50 of a mainline roadway 56. More particularly, the wrong way signs 32 of the first set are positioned approximately half way up the off ramp 50 on opposite sides thereof, while the wrong way signs of the second set are positioned closer to the beginning of the off ramp. Applicants theorize, without wishing to be bound thereto, that the effectiveness of the warning stations 31 may increase significantly by doubling the number of signs/beacons as shown. Additional signs/beacons may also be used, depending on the given location. In addition, in the present example additional motion sensors 55 are positioned at the beginning of the off ramp 50 and along the mainline roadway 56 just upstream from the off ramp entrance to provide still further certainty that the wrong way vehicle 51 has entered the roadway.

Figure 8:
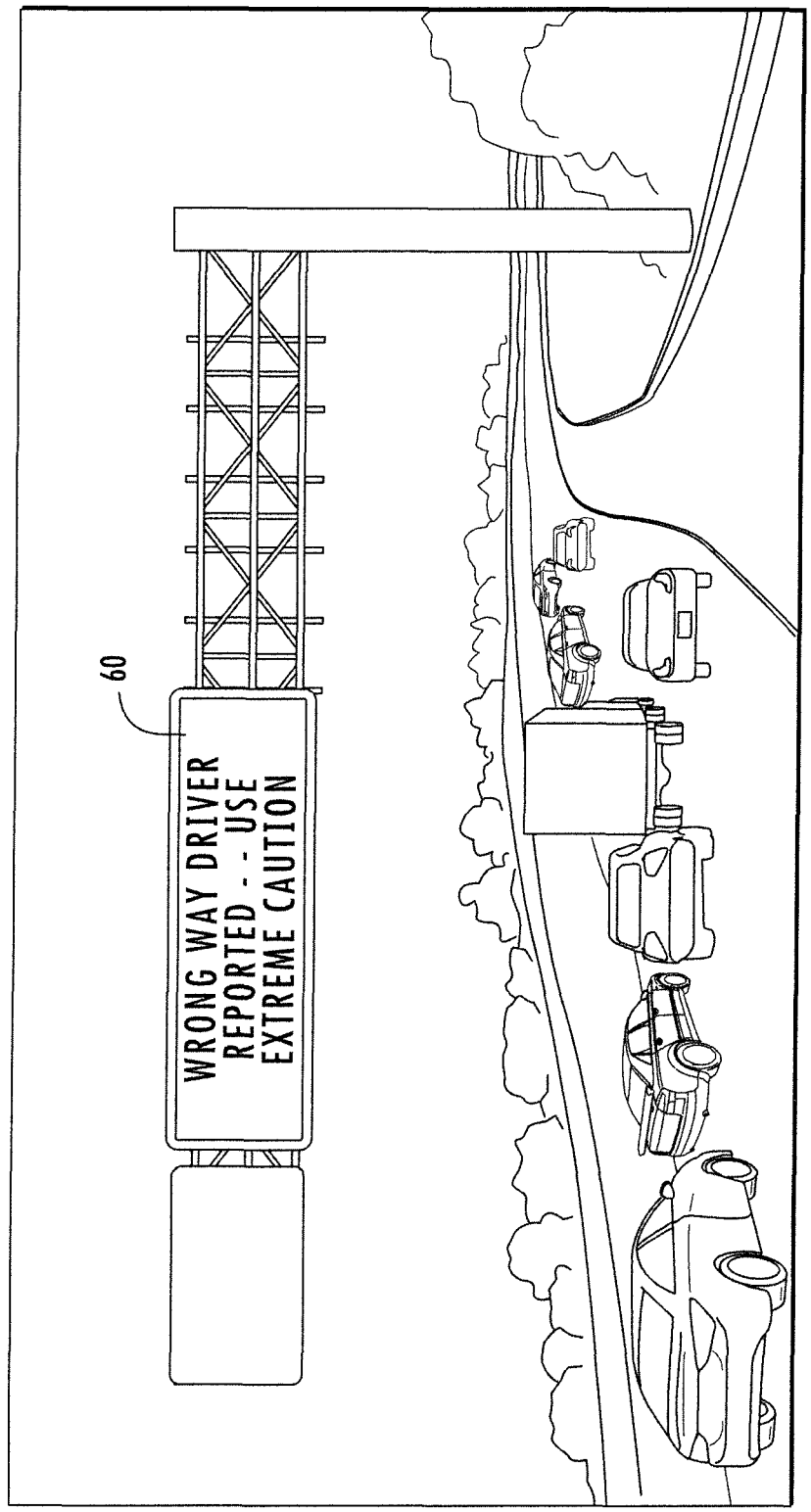
FIG. 8 is a perspective view of an electronic message board which may be used with the system of FIG. 1 to display a wrong way driver warning message in accordance with an example embodiment.

Referring additionally to FIG. 8, in some embodiments the system may further include one or more electronic message boards 60 (aka dynamic message signs or DMSs) positioned along the roadway which may be used to display various messages to oncoming traffic (i.e., right-way drivers). Responsive to a detection that a wrong way vehicle has gone beyond the warning station 31 and is about to enter (or has entered) the roadway, one or more electronic message boards 60 may be configured to then display a wrong way warning message to oncoming traffic. This may be done automatically responsive to the wrong way vehicle detection alert from the controller 38, and may be mapped only to the appropriate electronic message board(s) 60 on the roadway (e.g., only the electronic message board(s) immediately upstream from the off ramp where the wrong way driver was detected will display the message, and not electronic message boards facing the other direction along the roadway, for example. More particularly, the warning message may be mapped to those DMSs within a given number of miles upstream from the location where the wrong way vehicle detection occurred.

The number and manner in which the electronic message boards 60 are used to display the warning message may be different in other embodiments. For example, in the example illustrated in FIG. 8, a large overhead DMS is shown which is mounted over the mainline, but such signs are very expensive and therefore may be used sparingly along a roadway system. In other embodiments, smaller DMSs may be used in addition to, or instead of, the larger overhead DMSs. For example, the smaller DMSs may be positioned on posts alongside of the mainline (or on both sides), on toll booths, etc. In any event, use of overhead and/or small DMSs integrated with the above-described systems may accordingly provide an enhanced level of safety with the above-described RRFB technology, in that you first try to make the wrong way drivers turn around, and secondly inform the right way drivers about the imminent danger of a wrong way driver.

Figure 9:
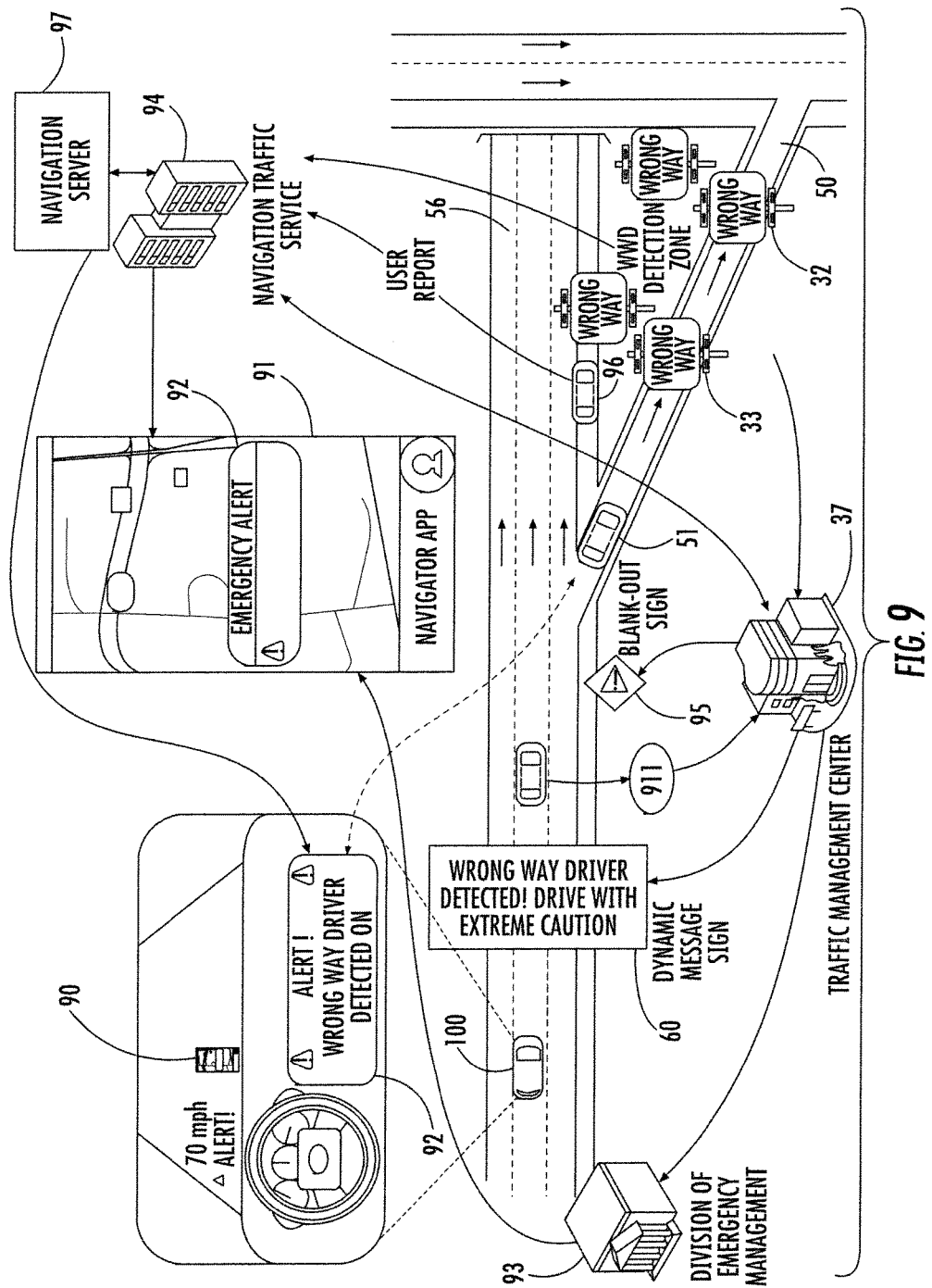
FIG. 9 is a schematic block diagram illustrating another example implementation of the system of FIG. 1 at an off ramp of a limited access roadway and providing in-car mobile device wrong way driver alert features.

Turning now to FIG. 9, in addition to (or instead of) DMSs, other automated driver alert approaches for notifying right way drivers of an approaching wrong way vehicle after detection by the systems described above may also be used. For example, such approaches may include smart phone apps, Bluetooth, or other mobile device communications. For example, similar to the way in which the wrong way warning message may be mapped to roadside DMSs 60 as described above, such a warning may similarly be provided to a navigation app such as Google Maps, Apple Maps, and Waze. Thus, right way drivers using such an app may receive an indicator on a display 91 of their mobile device 90 or in-car display 92 when they enter the area "upstream" of where a wrong way vehicle 51 was detected i.e., within a given geographical boundary of where the WWD incident was detected or reported from. Similarly, such apps may be used to provide an audible and/or visual alert 92 when danger from a wrong way driver is imminent, similar to an Amber or severe warning alert, for example. Such an alert may be provided even if the app is not currently being used by a right way driver (i.e., the warning may be detected through background operation of the app).

In the illustrated example, the emergency alert or warning is pushed or communicated to the navigation app via a governmental division of emergency management 93, which receives the wrong way driver information generated by wrong-way detectors at exit ramps or mainlines from the traffic management center 37. Moreover, the traffic management center 37 may also provide wrong way driver information to a navigation/traffic service 94, such as the host of the navigator app (e.g., Waze, Google Maps, Mapquest, etc.). In accordance with one example embodiment, a BlinkLink® traffic monitoring system event may be created notifying the Traffic Management Center 37 and/or the appropriate agency. Other types of detection devices could be used and installed on the highway exit ramps and or other locations other than BlinkLink® devices as well. The navigation traffic service 94 may host one or more navigation servers 97 that receive the WWD detection events/information from the warning station and send warnings to the mobile device 90 and/or heads up display (HUD) 92.

As a result, the enabled mobile device 90 (e.g., smart phones, tablet computers, laptops, etc.) may receive location-aware and trajectory-aware emergency alerts for the specified corridor and direction of travel. This advantageously allows wrong way driver alters to be integrated into traditional navigation devices. Furthermore, wrong way driver information may also be reported to the navigation/traffic service via right way drivers (vehicle 96) who spot wrong way drivers through the app interface. Various alert formats may be used, including live updates and pop-up icons or other messages to warn right way drivers on the mobile device 90 and/or display 92.

By receiving and distributing wrong-way driver notifications through private navigation/traffic services (such as Apple Maps, Waze, Garmin, car manufacturers own navigation systems that are built in the car, etc.), then these WWD warnings will be able to reach significantly more drivers than are currently reached with DMS. The navigation/traffic service may receive WWD reports in the following ways: (1) other users on the road through an incident reporting feature; (2) WWD detectors at highway off-ramps; and (3) by communicating directly with traffic management centers. This will also enable traffic management centers to be aware of events that were reported by other users but not via 911, WWD detectors, etc. The navigation/traffic service may distribute WWD alerts in the following ways: (1) smartphone app; (2) portable navigation device ("GPS Device"); and (3) in-vehicle navigator. Furthermore, location-aware and trajectory-aware wireless emergency alerts may also be pushed to the nearby right-way drivers in some embodiments. As noted above, this may be accomplished via communication with a government division of emergency management.

In one example implementation, blank-out signs 95 may be pre-programmed with warnings about a nearby wrong-way driver. These signs 95 may be illuminated by the traffic control center 37 to advantageously alert right-way drivers.

In accordance with one example implementation, when a wrong way driver enters the ramp, observers using social media traffic report applications may report the vehicle to warn other drivers. RRFB wrong way detection signs may create an alert for traffic applications, GPS devices, and other systems. The traffic management center 37 receives the alert and may also generate an alert in traffic report applications or send alerts to other agencies, as noted above. The appropriate agencies may also distribute the in-vehicle alerts, and social media traffic application users may receive the alerts directly from other users.

In some embodiments, the navigation app and alerts may be received by the mobile device 90 and provided to the in-car display 92 via a wired or wireless connection (e.g., USB, Bluetooth, etc.). Additionally, the alerts may be tailored to fit the type of wireless connection available. Moreover, an audio message may be appropriate to avoid distracted driving in some circumstances.

If the wrong way vehicle 51 is a connected vehicle, it may also warn the wrong way driver of the mistake (because it can communicate with the warning station). In addition, the connected vehicle 51 of the wrong way driver may communicate with connected vehicles 100 of right way drivers and/or traffic management center 37 to inform them of the wrong way driver (i.e., alert them). Moreover, when the warming station communicates the wrong way driver event to the traffic management center 37, it may also communicate the event at the same time (or after being verified by the traffic management center 37) to the right way driver connected vehicles 100. Furthermore, the right way driver connected vehicles 100 may optionally communicate with each other and with the traffic management center 37, and receive and send back information about the wrong way driver vehicle 51 independent of the warning station. As such, a holistic approach may be achieved with desired information fusion, redundancy, and confirmation by multiple sources, for example.

In some embodiments, an additional camera(s) may be added to the system to help further determine when drivers turn around as a result of recognizing they are driving the wrong way, or in the alternative that the wrong way vehicle actually entered onto a mainline road. For example, this may be particularly helpful at an off ramp to a mainline, such as described above, with the additional camera positioned at the end of the off ramp (i.e., where the mainline and the off ramp meet) and connected to the system controller to provide pictures back to the operations center. Verification of a wrong way driver turning around may be extremely useful, as it can save the time of law enforcement going after the wrong way driver if they just turn around in time and correct their action. On the other hand, this may also provide a final confirmation that the wrong way vehicle in fact entered the high speed mainline going the wrong way, so that immediate emergency intervention may be summoned.

The above-described systems and method may accordingly help bring to the attention of the wrong way driver that he/she is going the wrong way and turn around, stop, or get out of the way of right way drivers exiting the ramp, instead of continuing to drive the wrong way on the exit ramp and/or continue to drive all the way to the mainline facing right way vehicles head on. This may correct the wrong way driving behavior, and thereby save lives by avoiding wrong way crashes on exit ramps, mainlines, limited access highways and other high speed roads. These wrong way crashes often result in a high rate of fatalities, severe incapacitating injuries that lead to life time disabilities, intense damage to public and private property, and economic losses to public and private agencies due to significant time loss in congestion of the road where the crash occurred, or finding an alternative road to travel, while such crashes are being cleared.

It should also be noted that the above-described systems may be used in other locations besides off ramps or on the roadside of a mainline highway. For example, the systems and methods described herein may be used in the medians of mainline roads to detect when unauthorized personnel use the median to impermissibly turn around (e.g., use of a median which is for authorized personnel only). Another location at which the above-described approaches may be used are at traffic lights or other intersections, as well as on divided highways.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A wrong way vehicle detection system comprising:
    a warning station positioned along a roadway and comprising
        a wrong way indication sign facing away from a direction of oncoming traffic on the roadway,
        at least one flashing beacon adjacent the wrong way indication sign,
        a forward facing movement sensor adjacent the wrong way indication sign and facing away from the direction of oncoming traffic on the roadway, and
        a rear facing movement sensor adjacent the wrong way indication sign;
    a communications device;
    a controller configured to
        operate the forward facing movement sensor to detect a wrong way vehicle on the roadway,
        responsive to the detection of the wrong way vehicle on the roadway by the forward facing movement sensor, activate the at least one flashing beacon and operate the rear facing movement sensor to detect movement of the wrong way vehicle beyond the warning station, and
        responsive to detection of the wrong way vehicle moving beyond the warning station, send a wrong way vehicle detection alert via the communications device; and
    a navigation server configured to receive the wrong way vehicle detection alert and send a wrong way driver warning to at least one mobile wireless communications device within a geographic boundary of the warning station.

2. The system of claim 1 wherein the wrong way driver warning includes a wrong way indicator corresponding to a geographic location of the warning station.

3. The system of claim 1 wherein the wrong way driver warning includes a text message.

4. The system of claim 1 wherein the wrong way driver warning includes an audible message.

5. The system of claim 1 wherein the at least one flashing beacon comprises a pair of flashing beacons.

6. The system of claim 5 wherein the at least one pair of flashing beacons comprises an upper pair of flashing beacons above the wrong way indication sign, and a lower pair of flashing beacons positioned below the wrong way indication sign.

7. The system of claim 1 wherein the warning station further comprises a forward facing camera adjacent the wrong way indication sign and coupled to the controller; and wherein the controller further causes the forward facing camera to take a picture responsive to the forward facing movement sensor detecting the wrong way vehicle on the roadway.

8. The system of claim 1 wherein the warning station further comprises a rear facing camera adjacent the wrong way indication sign and coupled to the controller; and wherein the controller further causes the rear facing camera to take a picture responsive to the rear facing movement sensor detecting movement of the wrong way vehicle beyond the warning station.

9. The system of claim 1 wherein the warning station is positioned along an off ramp of a mainline roadway, and further comprising a camera positioned adjacent the intersection of the mainline roadway and the off ramp and configured to take a picture responsive to detecting movement of the wrong way vehicle beyond the warning station to confirm entry of the wrong way vehicle onto the mainline roadway.

10. The system of claim 1 wherein at least one of the forward facing and rear facing movement sensors comprises a radar sensor.

11. The system of claim 1 wherein at least one of the forward facing and rear facing movement sensors comprises a Light Detection and Ranging (LIDAR) sensor.

12. A wrong way vehicle detection method for a warning station positioned along a roadway, the warning station comprising a wrong way indication sign facing away from a direction of oncoming traffic on the roadway, at least one flashing beacon adjacent the wrong way indication sign, a forward facing movement sensor adjacent the wrong way indication sign and facing away from the direction of oncoming traffic on the roadway, and a rear facing movement sensor adjacent the wrong way indication sign, the method comprising:
   operating the forward facing movement sensor to detect a wrong way vehicle on the roadway;
   responsive to the detection of the wrong way vehicle on the roadway by the forward facing movement sensor, activating the at least one flashing beacon and operating the rear facing movement sensor to detect movement of the wrong way vehicle beyond the warning station using the controller;
   responsive to detection of the wrong way vehicle moving beyond the warning station, sending a wrong way vehicle detection alert via the communications device using the controller; and
   at a navigation server, receiving the wrong way vehicle detection alert and sending a wrong way driver warning to at least one mobile wireless communications device within a geographic boundary of the warning station.

13. The method of claim 12 wherein the wrong way driver warning includes a wrong way indicator corresponding to a geographic location of the warning station.

14. The method of claim 12 wherein the wrong way driver warning includes a text message.

15. The method of claim 12 wherein the wrong way driver warning includes an audible message.

16. The method of claim 12 wherein the at least one flashing beacon comprises an upper pair of flashing beacons above the wrong way indication sign, and a lower pair of flashing beacons positioned below the wrong way indication sign.

17. The method of claim 12 wherein the warning station further comprises a forward facing camera adjacent the wrong way indication sign and coupled to the controller; and further comprising causing the forward facing camera to take a picture responsive to the forward facing movement sensor detecting the wrong way vehicle on the roadway using the controller.

18. The method of claim 12 wherein the warning station further comprises a rear facing camera adjacent the wrong way indication sign and coupled to the controller; and further comprising causing the rear facing camera to take a picture responsive to the rear facing movement sensor detecting movement of the wrong way vehicle beyond the warning station using the controller.

19. The method of claim 12 wherein the warning station is positioned along an off ramp of a mainline roadway, and further comprising using a camera positioned adjacent the intersection of the mainline roadway and the off ramp to take a picture responsive to detecting movement of the wrong way vehicle beyond the warning station to confirm entry of the wrong way vehicle onto the mainline roadway.

* * * * *